(12) United States Patent
Blueml

(10) Patent No.: US 11,136,913 B2
(45) Date of Patent: Oct. 5, 2021

(54) CLAMPING AND JOINING DEVICE FOR AN EXHAUST GAS SYSTEM

(71) Applicant: Faurecia Emissions Control Technologies, Germany GmbH, Augsburg (DE)

(72) Inventor: Alfred Blueml, Augsburg (DE)

(73) Assignee: Faurecia Emissions Control Technologies, Germany GmbH

( * ) Notice: Subject to any disclaimer, the term of this patent is extended or adjusted under 35 U.S.C. 154(b) by 141 days.

(21) Appl. No.: 15/883,171

(22) Filed: Jan. 30, 2018

(65) Prior Publication Data

US 2018/0216516 A1 Aug. 2, 2018

(30) Foreign Application Priority Data

Jan. 31, 2017 (DE) ...................... 10 2017 101 858.1

(51) Int. Cl.
*F01N 13/18* (2010.01)
*B23P 19/00* (2006.01)
(Continued)

(52) U.S. Cl.
CPC ........ *F01N 13/1805* (2013.01); *B23P 19/006* (2013.01); *B23P 21/00* (2013.01);
(Continued)

(58) Field of Classification Search
CPC .... F01N 13/1805; F01N 13/009; F01N 3/021; F01N 3/10; F01N 2450/00;
(Continued)

(56) References Cited

U.S. PATENT DOCUMENTS 1,513,018 A * 10/1924 Tracy ...................... F16L 1/065
29/282
3,423,119 A * 1/1969 Stanley ................. B66C 1/0212
294/65
4,836,072 A 6/1989 Gerber
5,272,805 A * 12/1993 Akeel .............. G05B 19/41805
29/712

(Continued)

FOREIGN PATENT DOCUMENTS

DE 226504 A1 8/1985
DE 10023921 A1 11/2001
(Continued)

OTHER PUBLICATIONS

Search Report for German Application No. 102017101858.1, dated Sep. 7, 2017.

*Primary Examiner* — Sarang Afzali
(74) *Attorney, Agent, or Firm* — Carlson, Gaskey & Olds, P.C.

(57) ABSTRACT

An exhaust gas system clamping and joining device for clamping and joining at least two components of an exhaust gas system of an internal combustion engine for a motor vehicle has a clamping unit with at least one positioning unit and at least one holding unit, the holding unit being a vacuum system having at least one vacuum suction cup and a joining unit including a welding unit or a soldering unit. The two components of the exhaust gas system can be transferred by the positioning unit into a predetermined position and can be secured by the holding unit in the predetermined position and joined by the joining unit. An exhaust gas system clamping device for clamping at least two components of an exhaust gas system of an internal combustion engine for a motor vehicle has at least one positioning unit and at least one holding unit. The two components of the exhaust gas system can be transferred by the positioning unit into a predetermined position and can be secured by the holding unit in the predetermined position, (Continued)

the holding unit being a vacuum system having at least one vacuum suction cup.

15 Claims, 1 Drawing Sheet

(51) Int. Cl.
*B23P 21/00* (2006.01)
*F01N 3/021* (2006.01)
*F01N 13/00* (2010.01)
*F01N 3/10* (2006.01)

(52) U.S. Cl.
CPC .............. *F01N 3/021* (2013.01); *F01N 3/10* (2013.01); *F01N 13/009* (2014.06); *F01N 2450/00* (2013.01); *F01N 2450/22* (2013.01); *Y02A 50/20* (2018.01); *Y02T 10/12* (2013.01)

(58) Field of Classification Search
CPC .... F01N 2450/22; B23P 19/00; B23P 19/006; B23P 21/00; B23P 19/04; B21K 31/00; B21K 25/00; B23K 37/04; B21D 28/04; B25B 11/005; B25B 11/007; B23B 31/307; B23Q 2703/04; Y02T 10/20; Y02A 50/2322; Y10T 29/53; Y10T 29/53039; Y10T 29/53091; Y10T 29/53096; Y10T 29/53961; Y10T 29/53987; Y10T 29/53191
See application file for complete search history.

(56) References Cited

U.S. PATENT DOCUMENTS

| | | | | |
|---|---|---|---|---|
| 5,752,729 | A * | 5/1998 | Crozier | B66C 1/0218 294/2 |
| 6,149,375 | A * | 11/2000 | Hebrank | A01K 45/007 414/737 |
| 8,375,711 | B2 * | 2/2013 | Solomon | B66C 1/0256 60/456 |
| 8,863,371 | B2 * | 10/2014 | Brouwer | B23P 19/10 166/380 |
| 9,770,830 | B2 * | 9/2017 | Kuolt | F04D 25/16 |
| 2002/0003352 | A1 * | 1/2002 | Portal | B23Q 1/5462 279/3 |
| 2005/0132560 | A1 * | 6/2005 | Jones | B23Q 9/0014 29/559 |
| 2008/0011416 | A1 * | 1/2008 | DeMeter | C09J 5/00 156/273.3 |
| 2008/0111388 | A1 * | 5/2008 | Kniss | B65G 47/918 294/65 |
| 2009/0261574 | A1 * | 10/2009 | Blueml | F01N 13/1838 285/21.1 |
| 2010/0183415 | A1 * | 7/2010 | Solomon | B66C 13/12 414/627 |
| 2014/0197631 | A1 | 7/2014 | Blueml | |

FOREIGN PATENT DOCUMENTS

| | | |
|---|---|---|
| EP | 2062680 A1 | 5/2009 |
| FR | 2630368 A1 | 10/1989 |
| JP | H068098 A | 1/1994 |
| WO | 9512541 A1 | 5/1995 |
| WO | 2013004352 A1 | 1/2013 |

* cited by examiner

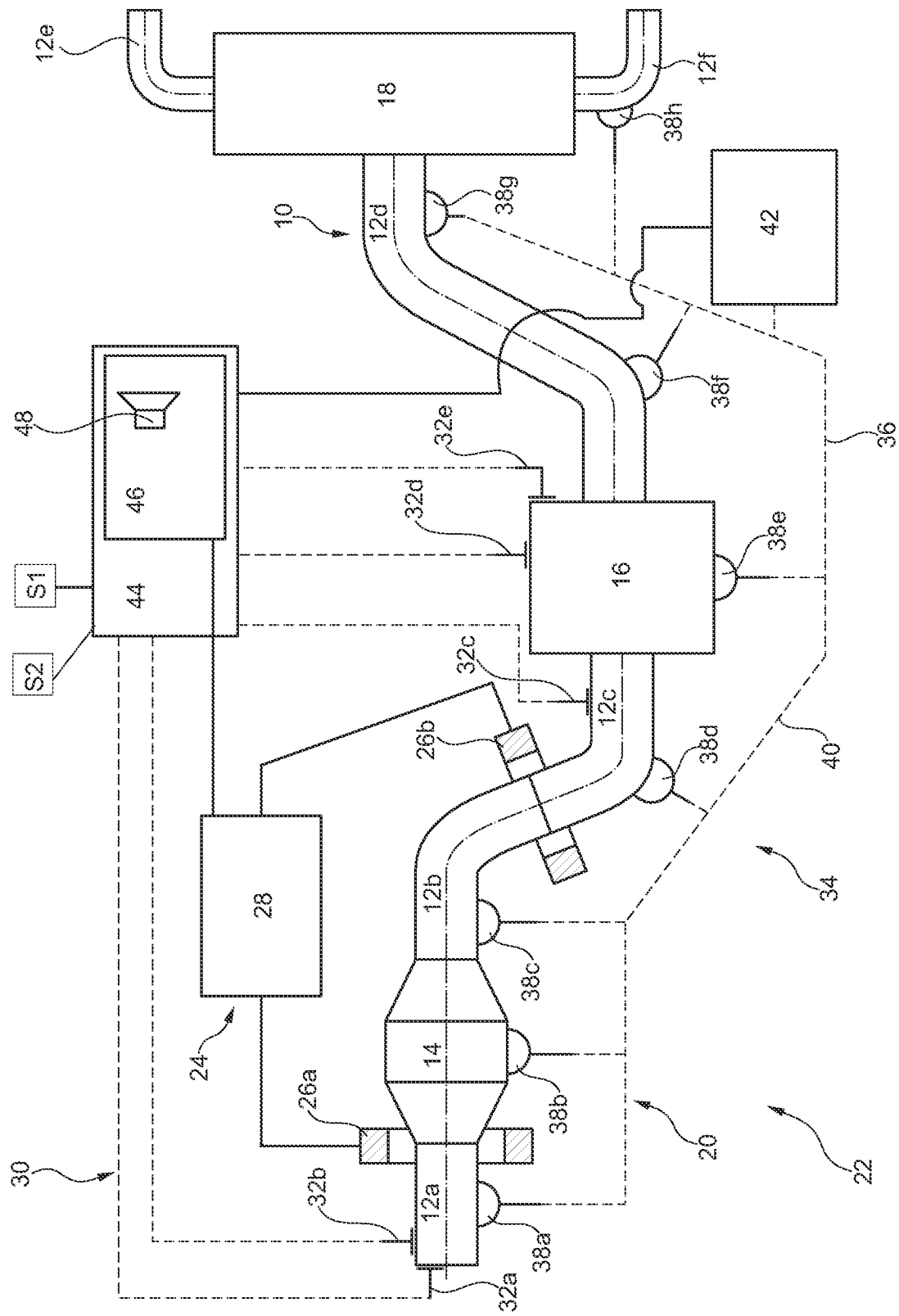

CLAMPING AND JOINING DEVICE FOR AN EXHAUST GAS SYSTEM

CROSS-REFERENCE TO RELATED APPLICATIONS

This application claims priority to DE10,2017/101858.1, filed Jan. 31, 2017.

FIELD OF THE INVENTION

The invention relates to a clamping device for an exhaust gas system for an internal combustion engine, a device for joining components of an exhaust gas system, to a method for clamping components of an exhaust gas system, and also to a method of joining at least two components of an exhaust gas system for a motor vehicle.

BACKGROUND

Clamping devices for clamping at least two components of an exhaust gas system of an internal combustion engine for a motor vehicle are known, in particular for clamping components of an exhaust gas system that are to be joined. The exhaust gas system clamping device has at least one positioning unit and at least one holding unit. The at least two components of the exhaust gas system can be transferred by the positioning unit into a predetermined position and can be secured by a holding unit in the predetermined position.

In this field, joining devices for an exhaust gas system of an internal combustion engine for a motor vehicle are known, these joining devices having such an exhaust gas clamping device.

Clamping and joining devices of this type are known from the prior art. The same applies for the methods for clamping and joining of the type mentioned above.

In general, components of an exhaust gas system that are to be joined are placed in an exhaust gas system clamping device. For this purpose, supporting geometries are provided in the exhaust gas system clamping device, said supporting geometries are usually tailored to the geometry of the components that are to be joined. The components that are to be joined are subsequently fastened in the clamping device in that said components are pressed against the supporting geometry by clips or clamps for example.

The clips or clamps are frequently closed manually.

Clips and clamps that can be actuated electrically or pneumatically have already been proposed during the course of efforts to provide a clamping arrangement of components of an exhaust gas system that functions more rapidly and is less complex.

In the case of exhaust gas system clamping devices that are configured in this manner, it is normally necessary to maintain particularly narrow tolerances with regard to the geometry and the positioning of the components that are to be joined as, when the exhaust gas system clamping device is being actuated in an electric or pneumatic manner, the "instinctive feeling" experienced during a manual actuation is frequently missing. Without these narrow tolerances, the components that are to be joined are at risk of being damaged when said components are being clamped. Consequently, electrically or pneumatically actuated exhaust gas system clamping devices are relatively complex to produce and therefore expensive.

There is a desire to further improve known exhaust gas system clamping devices and also to further improve known joining devices for exhaust gas systems. Simultaneously, known methods of clamping and for joining at least two components of an exhaust gas system are to be improved. Both the devices as well as the methods are to be simple and reliable. Moreover, said devices and methods are to render possible an as rapid as possible clamping procedure and a rapid joining procedure of components of an exhaust gas system. Moreover, it is intended that the devices can be produced in a cost-effective manner.

SUMMARY

An exhaust gas system clamping device for clamping at least two components of an exhaust gas system of an internal combustion engine for a motor vehicle, in particular for clamping components of an exhaust gas system that are to be joined, has at least one positioning unit and at least one holding unit. The at least two components of the exhaust gas system can be transferred by the positioning unit into a predetermined position and can be secured by the holding unit in the predetermined position. The holding unit is a vacuum system having at least one vacuum suction cup. The components that are to be clamped are, in particular, positioned by way of their ends, for example by way of corresponding stops. Furthermore, it is possible to staple the components in advance as sub-assemblies, or it is possible for said components to be connected to one another in another manner and consequently for said components to be placed as a component assembly into the exhaust gas system clamping device. Alternatively, it is also possible to integrate the individual components into the exhaust gas system clamping device. The vacuum suction cups are preferably produced from a flexible material. It is therefore possible to set up different geometries of the components that are to be clamped without it being necessary to exchange the vacuum suction cups. The vacuum suction cups themselves and also their function are also independent of possible geometry tolerances or positioning tolerances of the components that are to be clamped. The vacuum suction cups function reliably despite this. Moreover, it is essentially simultaneously possible to produce a vacuum at the vacuum suction cups. In comparison to the manual clamping procedure, it is therefore possible for the components to be clamped in a particularly rapid manner in an exhaust gas system clamping device using a vacuum system. The same applies for releasing the components. Moreover, it is possible in the case of the vacuum systems to control the correct clamping procedure in a particularly simple manner by way of monitoring the vacuum pressure or volume flows within the vacuum system. Furthermore, vacuum systems and vacuum suction cups are relatively cost-effective and simple to construct, in particular in comparison to electrically-actuated or pneumatic clamping systems It is preferred that the at least two components that are to be clamped are tube-shaped and the positioning unit and holding unit are configured for the purpose of positioning or holding tube-shaped components. The term "tube-shaped components" is to be understood to mean both tubes themselves as well as, by way of example, housings for catalytic converters or filters and also exhaust gas silencers and similar components. It is possible to provide corresponding supporting geometries in the exhaust gas system clamping device for this purpose in order to position such components. Moreover, vacuum suction cups are used that can also hold tube-shaped components. The exhaust gas system clamping unit is therefore particularly well suited to clamping components of exhaust gas systems.

The exhaust gas system clamping device can comprise at least two vacuum suction cups and the vacuum suction cups can be coupled to a common vacuum supply line. The vacuum suction cups can be coupled in parallel or in series. In each case, this provides a particularly simple and cost-effective construction of the vacuum system. It is possible to use a single vacuum pump that is coupled to all the vacuum suction cups. The number of vacuum suction cups that are used is dependent upon the components that are to be clamped. The vacuum system can also comprise 3 to 30 vacuum suction cups, wherein said system comprises by way of example 5, 10, 15, 20, or 25 vacuum suction cups. Consequently, it is ensured that the components that are to be clamped are held in a secure and reliable manner.

In accordance with one embodiment, the exhaust gas system clamping device comprises a control unit that makes it possible to actuate the holding unit in an automated manner, in particular wherein the positioning unit can also be actuated by the control unit in an automated manner. It is consequently possible to clamp and also to release the components in an automated manner. As a consequence, the manual outlay when operating the exhaust gas system clamping device is reduced. It is also possible in this manner to clamp and to release the components particularly rapidly. Furthermore, such control units function in general in a reliable manner with repetitive accuracy.

In a further development, the control unit comprises a monitoring unit that makes it possible to monitor the at least one actual state of the holding unit. In particular, the monitoring unit comprises a signal outputting unit that is activated in the event of a deviation of the actual state from a desired state of the holding unit. Whether the components are to be clamped or released can be a desired and/or actual state. The signal outputting unit is therefore, by way of example, activated if the components are to be clamped (desired state) but the components are not clamped or are not entirely clamped (actual state). The same applies in the reverse case, in which the components are to be released. The output signal can be optical, acoustic or haptic, wherein the term "haptic signal" is understood, by way of example, to mean vibration. A reliable operation of the exhaust gas system clamping device is consequently ensured, which results in a high quality of the exhaust gas systems.

Moreover, the object is achieved by virtue of a joining device having an exhaust gas system clamping device as defined above and further having a joining unit for joining at least two components of the exhaust gas system. The components of the exhaust gas system can consequently be joined in a simple, rapid and reliable manner. Moreover, such a joining device is simple in construction and therefore cost-effective.

The joining unit can be a welding unit or a soldering unit, in particular an induction soldering unit or a magnetic pulse welding unit. Such joining units are particularly well suited to joining components of an exhaust gas system.

In one variant, the joining unit is coupled to a monitoring unit of the exhaust gas system clamping device and the joining unit is deactivated in the event of a desired state of the holding unit deviating from an actual state of the holding unit and/or a desired state of the positioning unit deviating from an actual state of the positioning unit. Consequently, it is ensured that the joining unit is only activated if the components of the exhaust gas system are held correctly in the joining device. Consequently, reliable and repetitively accurate, high quality joining results are achieved. The effects and advantages that are mentioned further above in connection with a monitoring unit also apply in a similar manner.

Furthermore, the object is achieved by a method for clamping at least two components of an exhaust gas system of an internal combustion engine for a motor vehicle, said method comprising the following steps:
   a. Positioning the at least two components in an exhaust gas system clamping device in that at least one end of at least one of the two components is arranged on a positioning unit, and subsequently
   b. Fixing the at least two components by using a vacuum system having at least one vacuum suction cup.

The components can consequently be clamped in a rapid and reliable manner. Furthermore, such a method is particularly simple and as a consequence prone to few faults. Moreover, vacuum suction cups can lie against different geometries of the components that are to be clamped, with the result that it is possible to implement the method for a plurality of different components.

Advantageously, after the next step b) a check is performed as to whether the two components are fixed and/or positioned in a predetermined manner. The method therefore ensures that the components are always reliably clamped. Faults are therefore consequently avoided.

It is preferred that the method runs at least in a part-automated manner, preferably fully automated. As a consequence, the manual outlay that is required to implement the method reduces.

Moreover, the object is achieved by virtue of a method for joining at least two components of an exhaust gas system of a motor vehicle, the method comprising the following steps:
   a. Positioning the at least two components in an exhaust gas system clamping device in that at least one end of at least one of the two components is arranged on a positioning unit, subsequently
   b. Fixing the at least two components by using a vacuum system having at least one vacuum suction cup and subsequently
   c. Connecting the components that are to be joined by welding or soldering, in particular by induction soldering or magnetic pulse welding.

The components can consequently be joined to one another in a simple and reliable manner. Furthermore, the method can be implemented rapidly in comparison to known joining methods.

In one embodiment, the step c) is only performed if the step a) and/or the step b) has been checked or have been checked and if the two components have been positioned and/or fixed in a predetermined manner. Faults are thus reliably avoided when implementing the step c), in other words, when the components that are to be joined are being connected. As a consequence, the method is altogether reliable and robust as far as faults are concerned.

It is preferred that the method run as least in part-automated manner, preferably fully automated. With regard to the effects and advantages reference is made to the method for clamping at least two components of an exhaust gas system of an internal combustion engine.

BRIEF DESCRIPTION OF THE DRAWING

The invention is further explained hereinunder with reference to an exemplary embodiment that is illustrated in the attached drawings. In the FIGURES:

FIG. 1 illustrates schematically a joining device in accordance with the invention having an exhaust gas system clamping device in accordance with the invention in which an exemplary exhaust gas system is arranged.

DETAILED DESCRIPTION

FIG. 1 illustrates an exhaust gas system 10 of an internal combustion engine for a motor vehicle, said exhaust gas system comprising multiple components 12a-12f, 14, 16, 18 that are to be joined.

The components 12a-12f are straight or curved tube sections.

The component 14 is embodied as a particulate filter and the component 16 is embodied as a catalytic converter.

The component 18 is an end silencer.

The construction of the exhaust gas system 10 is to be understood as exemplary and is therefore used merely for the purposes of illustration.

The exhaust gas system 10 is arranged in an exhaust gas system clamping device 20 that is an integral part of a joining device 22 in the illustrated embodiment.

Moreover, the joining device 22 comprises a joining unit 24 for joining the components 12a-12f, 14, 16, 18 of the exhaust gas system 10. The joining unit 24 is illustrated as two stylized inductors 26a, 26b of an induction soldering unit 28.

The exhaust gas system clamping device 20 is configured to clamp at least two components 12a-12f, 14, 16, 18 of the exhaust gas system 10, wherein said exhaust gas clamping device is configured in particular to position and hold tube-shaped components 12a-12f, 14, 16, 18.

The exhaust gas system clamping device 20 further comprises a positioning unit 30 that is symbolized as including positioning stops 32a-32e. The positioning stops 32a-32e are only illustrated schematically.

The components 12a-12f, 14, 16, 18 of the exhaust gas system 10 can be transferred by the positioning unit 30 into a predetermined position.

Furthermore, the exhaust gas system clamping device 20 comprises a holding unit 34 that is a vacuum system 36 having vacuum suction cups 38a-38h. The vacuum system 36 and the vacuum suction cups 38a-38h are only illustrated schematically.

The components 12a-12f, 14, 16, 18 of the exhaust gas system 10 can be secured by the vacuum system 36 into a predetermined position.

The vacuum suction cups 38a-38h are coupled to a common vacuum supply line 40.

Furthermore, the vacuum supply line 40 is connected to the vacuum pump 42.

Furthermore, the exhaust gas system clamping device 20 comprises a control unit 44 that makes it possible to actuate the holding device 34 and also the positioning unit 30 in an automated manner.

The control unit 44 comprises a monitoring unit 46 that makes it possible to monitor actual states of the holding unit 34 and also actual states of the positioning unit 30.

In one example, the holding unit 34 comprises corresponding sensors S1, for example pressure sensors and flow sensors.

In one example, the positioning unit 30 comprises position sensors S2 in the form of proximity switches.

The monitoring unit 46 can output signals via a signal outputting unit 48 that is illustrated as a schematic loudspeaker but can be any type of signal outputting unit.

In the event of a deviation of the actual state from a desired state of the holding unit 34 and/or the positioning unit 30 the signal outputting unit 48 is activated and therefore outputs a tone in the illustrated example.

The joining unit 24 is likewise coupled to the monitoring unit 46 of the exhaust gas system clamping device 20.

The joining unit 24 is always deactivated in the event of a desired state of the holding unit 34 or the positioning unit 30 deviating from an associated actual state.

The following procedure is performed in order to clamp the components 12a-12f, 14, 16, 18 of the exhaust gas system 10. Initially, the components 12a-12f, 14, 16, 18 are positioned by the positioning unit 30 in the exhaust gas system clamping device 20 in that at least one end of at least one of the components 12a-12f, 14, 16, 18 is arranged on the positioning unit 30.

The components 12a-12f, 14, 16, 18 are subsequently fixed by the vacuum system 36 having the vacuum suction cups 38a-38h.

A check is subsequently performed by the monitoring unit 46 as to whether the two components 12a-12f, 14, 16, 18 are fixed and/or positioned in a predetermined manner.

This proceeds in a fully automated manner.

If the components 12a-12f, 14, 16, 18 of the exhaust gas system 10 are to be joined, the components 12a-12f, 14, 16, 18 are connected in a subsequent step by welding or soldering. In one example, the induction soldering unit 28 is used for this purpose.

However, the components 12a-12f, 14, 16, 18 are only joined after the components 12a-12f, 14, 16, 18 have been positioned and/or fixed in a predetermined manner.

The method for joining the components also proceeds in a fully automated manner.

The invention claimed is:

1. A device comprising a joining unit and a clamping unit device comprising:
   a clamping unit comprising at least one positioning unit and at least one holding unit, the at least one positioning unit being separate from the at least one holding unit, and wherein the clamping unit clamps at least two components of an exhaust gas system of an internal combustion engine for a motor vehicle at the same time:
   wherein the at least two components of an exhaust gas system can be transferred by the at least one positioning unit into a predetermined position and can be secured by the at least one holding unit in the predetermined position;
   wherein the at least one positioning unit includes a plurality of positioning stops that are associated with the at least two components;
   wherein the at least one holding unit comprises a vacuum system having a plurality of vacuum suction cups;
   a control unit configured to actuate the at least one holding unit in an automated manner, wherein the control unit comprises a monitoring unit configured to monitor at least one actual state of the at least one holding unit and at least one actual state of the at least one positioning unit;
   the positioning unit comprising position sensors for detecting the at least one actual state of the at least one positioning unit; and
   a joining unit configured to join the at least two components of the exhaust gas system;
   wherein the joining unit is a welding unit or a soldering unit.

2. The device of claim 1, wherein the at least two components of the exhaust gas system are configured to conduct engine exhaust gases generated by a vehicle engine.

3. The device of claim 2, wherein the at least two components of the exhaust gas system comprise at least two of: straight tube sections, curved tube sections, a particulate filter, a catalytic converter, and a silencer.

4. The device of claim 3, wherein the at least two components of the exhaust gas system comprise more than two components of the exhaust gas system and include at least one straight tube section, at least one curved tube section, at least one particulate filter, at least one catalytic converter, and at least one silencer.

5. The device of claim 1, wherein the at least two components that are to be clamped are tube-shaped and the at least one positioning unit is configured to position tube-shaped components and the at least one holding unit is configured to hold tube-shaped components.

6. The device of claim 1, wherein the plurality of vacuum suction cups are coupled to a common vacuum supply line.

7. The device of claim 1, wherein the control unit is configured to actuate the at least one positioning unit.

8. The device of claim 1, wherein the monitoring unit comprises a signal output unit that is activated in the event of a deviation of the at least one actual state from a desired state of the at least one holding unit.

9. The device of claim 1, wherein the welding unit is a magnetic pulse welding unit and the soldering unit is an induction soldering unit.

10. The device of claim 1, wherein the joining unit is coupled to the monitoring unit of the exhaust gas system clamping device and the joining unit is deactivated in an event of a desired state of the at least one holding unit deviating from an actual state of the at least one holding unit and/or a desired state of the at least one positioning unit deviating from an actual state of the at least one positioning unit.

11. A device comprising a joining unit and a clamping unit, said device comprising:
a clamping unit comprising a positioning unit and at least one holding unit, the positioning unit being separate from the at least one holding unit, and wherein the clamping unit clamps at least two components of an exhaust gas system of an internal combustion engine for a motor vehicle at the same time:
wherein the at least two components of an exhaust gas system can be positioned by the positioning unit into a predetermined position and can be secured by the at least one holding unit in the predetermined position;
wherein the positioning unit includes a plurality of positioning stops that are associated with the at least two components;
wherein the at least one holding unit comprises a vacuum system having a plurality of vacuum suction cups;
a control unit configured to actuate the at least one holding unit in an automated manner, wherein the control unit comprises a monitoring unit configured to monitor at least one actual state of the at least one holding unit and at least one actual state of the positioning unit;
the positioning unit comprising position sensors for detecting the at least one actual state of the positioning unit; and
a joining unit configured to join the at least two components of the exhaust gas system;
wherein the joining unit is a welding unit or a soldering unit.

12. The device of claim 11, wherein the at least one holding unit comprises additional sensors for detecting the at least one actual state of the at least one holding unit.

13. The device of claim 12, wherein the position sensors comprises proximity switches, and wherein the additional sensors comprise pressure sensors and/or flow sensors.

14. The device of claim 11, wherein the positioning unit is configured to position the at least two components in the predetermined position via the plurality of positioning stops, and the at least one holding unit is configured to hold the at least two components in the predetermined position via the plurality of vacuum suction cups.

15. The device of claim 11, wherein the welding unit is a magnetic pulse welding unit and the soldering unit is an induction soldering unit.

* * * * *